(12) United States Patent
Dognin et al.

(10) Patent No.: US 11,829,726 B2
(45) Date of Patent: Nov. 28, 2023

(54) DUAL LEARNING BRIDGE BETWEEN TEXT AND KNOWLEDGE GRAPH

(71) Applicant: International Business Machines Corporation, Armonk, NY (US)

(72) Inventors: Pierre L. Dognin, White Plains, NY (US); Igor Melnyk, White Plains, NY (US); Inkit Padhi, White Plains, NY (US); Payel Das, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 17/157,963

(22) Filed: Jan. 25, 2021

(65) Prior Publication Data
US 2022/0237389 A1   Jul. 28, 2022

(51) Int. Cl.
*G06F 40/47*       (2020.01)
*G06F 40/284*      (2020.01)
(Continued)

(52) U.S. Cl.
CPC ............ *G06F 40/47* (2020.01); *G06F 40/284* (2020.01); *G06N 5/02* (2013.01); *G06N 20/00* (2019.01)

(58) Field of Classification Search
CPC .......... G06F 40/30; G06F 40/47; G06F 40/51; G06F 40/205; G06F 40/284; G06N 3/042;
(Continued)

(56) References Cited

U.S. PATENT DOCUMENTS

2005/0015240 A1\*  1/2005  Appleby ................. G06F 40/45
                                                            704/9
2018/0108443 A1    4/2018  Li
(Continued)

FOREIGN PATENT DOCUMENTS

CN          107590139 A   \*   1/2018
CN          109192321 A        1/2019
(Continued)

OTHER PUBLICATIONS

Mell et al., "The NIST Definition of Cloud Computing," Recommendations of the National Institute of Standards and Technology, NIST Special Publication 800-145, Sep. 2011, 7 pages.
(Continued)

*Primary Examiner* — Daniel C Washburn
*Assistant Examiner* — Paul J. Mueller
(74) *Attorney, Agent, or Firm* — Amin, Turocy & Watson, LLP

(57) ABSTRACT

Systems, computer-implemented methods, and computer program products to facilitate a dual learning bridge between text and a knowledge graph are provided. According to an embodiment, a system can comprise a processor that executes computer executable components stored in memory. The computer executable components comprise a model component that employs a model to learn associations between text data and a knowledge graph. The computer executable components further comprise a translation component that uses the model to bidirectionally translate second text data and one or more knowledge graph paths based on the associations.

20 Claims, 16 Drawing Sheets

(51) Int. Cl.
*G06N 5/02* (2023.01)
*G06N 20/00* (2019.01)

(58) Field of Classification Search
CPC ............ G06N 3/045; G06N 3/08; G06N 5/02; G06N 5/025; G06N 20/00
See application file for complete search history.

(56) References Cited

U.S. PATENT DOCUMENTS

| | | | |
|---|---|---|---|
| 2020/0218988 | A1 | 7/2020 | Boxwell et al. |
| 2020/0356867 | A1* | 11/2020 | Okajima ............... G06N 5/02 |
| 2021/0192364 | A1* | 6/2021 | Wang ............... G06F 18/24147 |
| 2021/0279952 | A1* | 9/2021 | Chen ................... G06T 17/00 |
| 2021/0390270 | A1* | 12/2021 | Fei ..................... G06N 3/045 |
| 2022/0198254 | A1* | 6/2022 | Dalli .................... G06N 3/044 |

FOREIGN PATENT DOCUMENTS

| | | |
|---|---|---|
| CN | 106156365 B | 6/2019 |
| CN | 110347798 A | 10/2019 |
| CN | 107545791 B | 3/2020 |
| CN | 111046185 A | 4/2020 |
| WO | 201494332 A1 | 6/2014 |

OTHER PUBLICATIONS

Bosselut et al. "Comet: Commonsense transformers for automatic knowledge graph construction". In: arXiv preprint arXiv:1906.05317 (2019).

Clancy et al., "Scalable Knowledge Graph Construction from Text Collections". In: Proceedings of the Second Workshop on Fact Extraction and VERification (FEVER). 2019, pp. 39-46.

Dettmers et al. "Convolutional 2D Knowledge Graph Embeddings". In: Thirty-Second AAAI Conference on Artificial Intelligence. 2018. url: https://www.aaai.org/ocs/index.php/AAAI/AAAI18/paper/download/17366/15884.

Guo et al. "CycleGT: Unsupervised Graph-to-Text and Text-to-Graph Generation via Cycle Training". In: arXiv preprint arXiv:2006.04702 (2020).

Koncel-Kedziorski et al. "Text generation from knowledge graphs with graph transformers". In: arXiv preprint arXiv:1904.02342 (2019).

Li et al. "Commonsense Knowledge Base Completion". In: Proc. of ACL. 2016.

Malaviya et al. "Commonsense Knowledge Base Completion with Structural and Semantic Context". In:Proceedings of the 34th AAAI Conference on Artificial Intelligence (2020).

Marcheggiani et al., "Deep graph convolutional encoders for structured data to text generation". In: arXiv preprint arXiv:1810.09995 (2018).

Ribeiro et al. "Modeling Global and Local Node Contexts for Text Generation from Knowledge Graphs". In:arXiv preprint arXiv:2001.11003 (2020).

Schmitt et al., "An Unsupervised Joint System for Text Generation from Knowledge Graphs and Semantic Parsing". In: ArXiv abs/1904.09447 (2020).

Shang et al. "End-to-end Structure-Aware Convolutional Networks for Knowledge Base Completion". In: AAAI. 2019. url: https://arxiv.org/pdf/1811.04441.pdf.

Trouillon et al. "Complex embeddings for simple link prediction". In: ICML. 2016, pp. 2071-2080. url: http://proceedings.mlr.press/v48/trouillon16.pdf.

Yang et al. "Embedding Entities and Relations for Learning and Inference in Knowledge Bases". In: Proceedings of the International Conference on Learning Representations (ICLR). May 2015. url: https://www.microsoft.com/enus/research/publication/embedding-entities-andrelations-for-learning-and-inference-inknowledge-bases/.

* cited by examiner

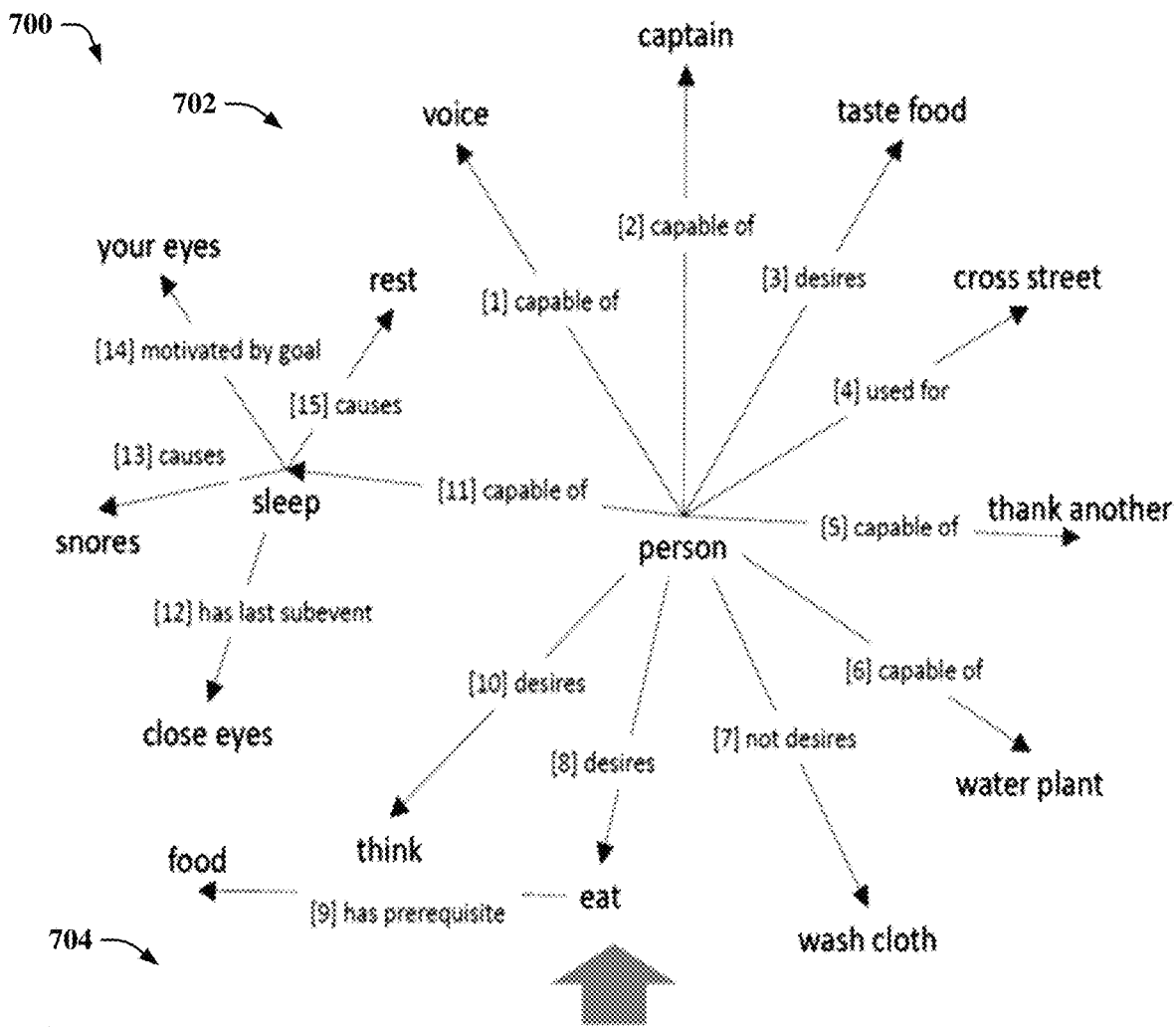

[1] a person can voice an opinion
[2] a person can captain a ship
[3] a person can taste food
[4] person can cross the street
[5] person can thank another person
[6] a person can water a plant
[7] person can wash cloths
[8] person can eat
[9] you eat food
[10] a person can think
[11] a person can sleep
[12] if you want to sleep then you should close eyes
[13] sleep would make you want to snore
[14] if you want to sleep then you should close your eyes
[15] you sleep to rest.

FIG. 7

| | MRR | HITS@1 | HITS@3 | HITS@10 | GED↓ |
|---|---|---|---|---|---|
| Conventional KG Completion | | | | | |
| DistMult (Yang et al. 2015) | 8.97 | 4.51 | 9.76 | 17.44 | - |
| ComplEx (Trouillon et al. 2016) | 11.40 | 7.42 | 12.45 | 19.01 | - |
| ConvE (Dettmers et al. 2018) | 20.88 | 13.97 | 22.91 | 34.02 | - |
| ConvTransE (Shang et al. 2019) | 18.68 | 7.87 | 23.87 | 38.95 | - |
| S+G+B+C (Malaviya et al. 2020) | 51.11 | 39.42 | 59.58 | 73.59 | - |
| Generative KG Completion | | | | | |
| DualTKB$_{GRU-GRU}$, $\rho = 0.5$ | 63.10 | 55.38 | 69.75 | 74.58 | 12.5 |
| DualTKB$_{BERT-GRU}$, $\rho = 0.2$ | 61.32 | 53.79 | 67.62 | 72.29 | 12.0 |
| DualTKB$_{Trans-Trans}$, $\rho = 0.5$ | 50.54 | 44.54 | 55.12 | 59.67 | 10.0 |
| DualTKB*$_{GRU-GRU}$, $\rho = 0.5$ | 50.87 | 44.58 | 55.46 | 60.12 | 9.0 |
| DualTKB*$_{BERT-GRU}$, $\rho = 0.5$ | 57.79 | 50.25 | 63.75 | 69.54 | 11.0 |
| DualTKB*$_{Trans-Trans}$, $\rho = 1.0$ | 40.93 | 35.67 | 44.38 | 48.79 | 8.0 |

FIG. 9

| | $B_2$ | $B_3$ | $R_L$ | $B_{F1}$ |
|---|---|---|---|---|
| DUALTKB$_{GRU-GRU}$ | 0.32 | 0.24 | 0.46 | 0.89 |
| DUALTKB$_{BERT-GRU}$ | 0.32 | 0.25 | 0.46 | 0.88 |
| DUALTKB$_{Trans-Trans}$ | 0.45 | 0.37 | 0.56 | 0.91 |
| DUALTKB*$_{GRU-GRU}$ | 0.49 | 0.42 | 0.61 | 0.92 |
| DUALTKB*$_{BERT-GRU}$ | 0.37 | 0.30 | 0.51 | 0.89 |
| DUALTKB*$_{Trans-Trans}$ | 0.47 | 0.39 | 0.57 | 0.91 |

FIG. 10

| Losses | DualTKB$_{GRU-GRU}$ | | DualTKB$_{BERT-GRU}$ | | DualTKB$_{Trans-Trans}$ | |
|---|---|---|---|---|---|---|
| | MRR | BLEU2 | MRR | BLEU2 | MRR | BLEU2 |
| $\mathcal{L}_{REC} + \mathcal{L}_{BT} + \mathcal{L}_{SUP}$ | 63.10 | 0.32 | 61.32 | 0.32 | 50.53 | 0.45 |
| $\mathcal{L}_{BT} + \mathcal{L}_{SUP}$ | 17.09 | 0.48 | 0.14 | 0.07 | 45.42 | 0.46 |
| $\mathcal{L}_{BT} + \mathcal{L}_{REC}$ | 20.08 | 0.25 | 52.52 | 0.03 | 23.56 | 0.26 |
| $\mathcal{L}_{REC} + \mathcal{L}_{SUP}$ | 46.16 | 0.46 | 57.57 | 0.34 | 44.08 | 0.42 |

FIG. 12

DUAL LEARNING BRIDGE BETWEEN TEXT AND KNOWLEDGE GRAPH

BACKGROUND

The subject disclosure relates to knowledge graphs, and more specifically, to a dual learning bridge between text and a knowledge graph.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate a dual learning bridge between text and a knowledge graph are described.

According to an embodiment, a system can comprise a processor that executes computer executable components stored in memory. The computer executable components comprise a model component that employs a model to learn associations between text data and a knowledge graph. The computer executable components further comprise a translation component that uses the model to bidirectionally translate second text data and one or more knowledge graph paths based on the associations.

According to another embodiment, a computer-implemented method can comprise employing, by a system operatively coupled to a processor, a model to learn associations between text data and a knowledge graph. The computer-implemented method can further comprise using, by the system, the model to bidirectionally translate second text data and one or more knowledge graph paths based on the associations.

According to another embodiment, a computer program product comprising a computer readable storage medium having program instructions embodied therewith, the program instructions executable by a processor to cause the processor to employ a model to learn associations between text data and a knowledge graph. The program instructions are further executable by the processor to cause the processor to use the model to bidirectionally translate second text data and one or more knowledge graph paths based on the associations.

DESCRIPTION OF THE DRAWINGS

FIGS. 3, 4, 5A, 5B, 6, 7, 8, 9, 10, and 12 illustrate example, non-limiting diagrams that can facilitate a dual learning bridge between text and a knowledge graph in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a human, a client, a user, a computing device, a software application, an agent, a machine learning (ML) model, an artificial intelligence (AI) model, a token, a feature, an object, a character, a graph node, a graph path (e.g., a graph edge), and/or another entity. As referenced herein and/or annotated in the figures, a "knowledge graph" and/or a "knowledge base" can be used interchangeably to denote a structured representation of knowledge (e.g., data).

Notations used herein and/or in one or more figures of the subject disclosure are as follows.

$x_S$ denotes a sentence, where type S can be

A, $A^m$ sentence, a masked sentence

AA given A, a reconstructed sentence

BA given B, a generated sentence

ABA given AB, a back-translated sentence $x_P$ denotes a path, where type P can be B, $B^m$ path, a masked path BB given B, a reconstructed path $B^m B$ given $B^m$, a reconstructed path AB given A, a generated path BAB given BA, a back-translated B w denotes an edge w=($e_h$, r, $e_t$) with (entity, rel. op., entity)

$w^m$ denotes a masked edge and/or tuple, for example, ($e_h$, r, .), (., r, $e_t$), and so on.

Figure 1:
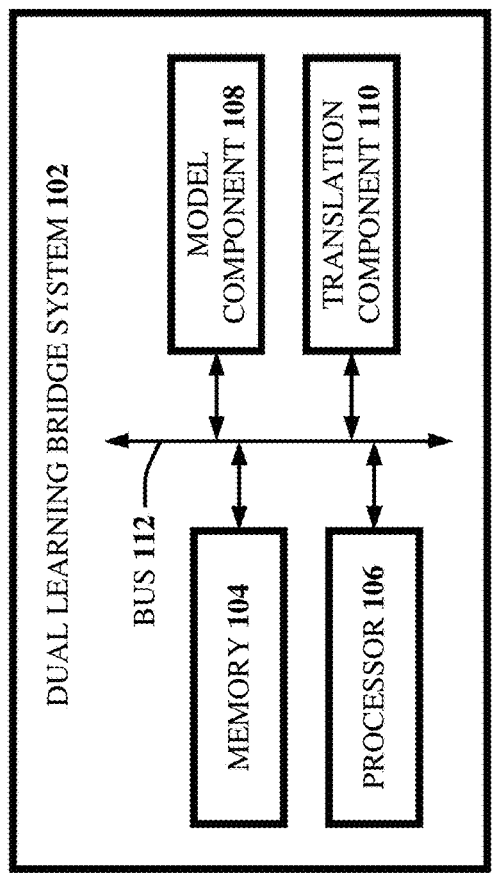
FIGS. 1 and 2 illustrate block diagrams of example, non-limiting systems that can facilitate a dual learning bridge between text and a knowledge graph in accordance with one or more embodiments described herein.
Figure 2:
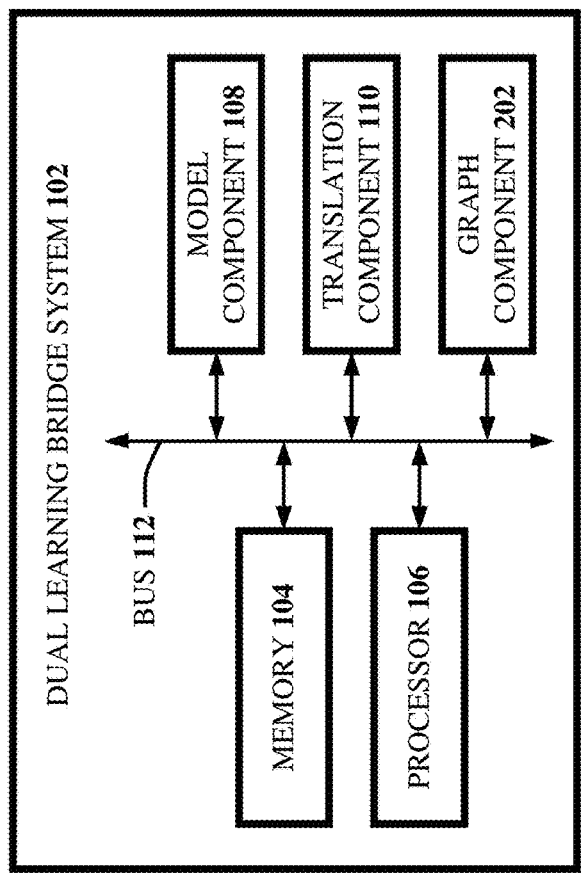

$T_D$ denotes a translation task with direction D $T_{AB}$ denotes a translation from A to B. $x_{AB}=T_{AB}(x_A)$ $T_{BA}$ denotes a translation from B to A. $x_{BA}=T_{BA}(x_B)$ $T_{ABA}$ denotes a back-translation from AB, back to A where $x_{ABA}=T_{BA}(x_{AB})=T_{BA}(T_{AB}(x_A))$ $T_{BAB}$ denotes a back-translation from BA to B where $x_{BAB}=T_{AB}(x_{BA})=T_{AB}(T_{BA}(x_B))$ $T_B^m{}_B$ denotes a generation from masked path $x_P=T_B^m{}_B(x^m{}_P)$ FIGS. 1 and 2 illustrate block diagrams of example, non-limiting systems 100 and 200, respectively, that can each facilitate a dual learning bridge between text and a knowledge graph in accordance with one or more embodiments described herein. System 100 and 200 can each comprise a dual learning bridge system 102. Dual learning bridge system 102 of system 100 depicted in FIG. 1 can comprise a memory 104, a processor 106, a model component 108, a translation component 110, and/or a bus 112. Dual learning bridge system 102 of system 200 depicted in FIG. 2 can further comprise a graph component 202.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or dual learning bridge system 102 can further comprise various computer and/or computing-based elements described herein with reference to operating environment 1400 and FIG. 14. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to dual learning bridge system 102, model component 108, translation component 110, graph component 202, and/or another component associated with dual learning bridge system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 1416 and FIG. 14. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1414 and FIG. 14. Such examples of processor 106 can be employed to implement any embodiments of the subject disclosure.

Dual learning bridge system 102, memory 104, processor 106, model component 108, translation component 110, graph component 202, and/or another component of dual learning bridge system 102 as described herein can be communicatively, electrically, operatively, and/or optically coupled to one another via bus 112 to perform functions of system 100, system 200, dual learning bridge system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1418 and FIG. 14. Such examples of bus 112 can be employed to implement any embodiments of the subject disclosure.

Dual learning bridge system 102 can comprise any type of component, machine, device, facility, apparatus, and/or instrument that comprises a processor and/or can be capable of effective and/or operative communication with a wired and/or wireless network. All such embodiments are envisioned. For example, dual learning bridge system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Dual learning bridge system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, dual learning bridge system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, dual learning bridge system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Dual learning bridge system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, dual learning bridge system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between dual learning bridge system 102 and external systems, sources, and/or devices (e.g., computing devices, communication devices, and/or another type of external system, source, and/or device).

Dual learning bridge system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with dual learning bridge system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, model component 108, translation component 110, graph component 202, and/or any other components associated with dual learning bridge system 102 as disclosed herein (e.g., communicatively, electronically, operatively, and/or optically coupled with and/or employed by dual learning bridge system 102), can comprise such computer and/or machine readable, writable, and/or executable component(s) and/or instruction(s). Consequently, according to numerous embodiments, dual learning bridge system 102 and/or any components associated therewith as disclosed herein, can employ processor 106 to execute such computer and/or machine readable, writable, and/or executable component(s) and/or instruction(s) to facilitate performance of one or more operations described herein with reference to dual learning bridge system 102 and/or any such components associated therewith.

Dual learning bridge system 102 can facilitate (e.g., via processor 106) performance of operations executed by and/or associated with model component 108, translation component 110, graph component 202, and/or another component associated with dual learning bridge system 102 as disclosed herein. For example, as described in detail below, dual learning bridge system 102 can facilitate (e.g., via processor 106): employing a model to learn associations between text data and a knowledge graph; and/or using the model to bidirectionally translate second text data and one or more knowledge graph paths based on the associations.

In another example, as described in detail below, dual learning bridge system 102 can further facilitate (e.g., via processor 106): generating a second knowledge graph using at least one of the knowledge graph or the one or more knowledge graph paths, thereby providing at least one of a reduced processing workload associated with generating the second knowledge graph, a reduced build time associated with generating the second knowledge graph, enrichment of the knowledge graph or the second knowledge graph, or completion of the knowledge graph or the second knowledge graph; employing the model to learn the associations using at least one of an unsupervised learning technique or a supervised learning technique; using the model to translate the second text data to the one or more knowledge graph paths based on the associations, where at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph; using the model to translate the one or more knowledge graph paths to the second text data based on the associations, where at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and further comprising; employing the model to learn the associations using an unsupervised learning technique and cyclical translation of at least one of the text data and knowledge graph paths of the knowledge graph or the second text data and the one or more knowledge graph paths; and/or employing an encoder-decoder architecture having an encoder and at least two decoders to learn the associations between the text data and the knowledge graph and using the encoder-decoder architecture to bidirectionally translate the second text data and the one or more knowledge graph paths based on the associations, where the knowledge graph is indicative of prior knowledge corresponding to a domain.

Model component 108 can employ a model to learn associations between text data and a knowledge graph. For example, model component 108 can employ a model to learn associations between text data and a commonsense knowledge graph, a biomedical knowledge graph, and/or another domain and/or type of knowledge graph, where such text data can include, but is not limited to, structured text data, unstructured text data, a sequence of tokens, a sequence of textual characters, a sequence of alphanumeric characters, at least one word, at least one number, at least one sentence, and/or at least one paragraph. In various embodiments, such a knowledge graph defined above can be indicative of prior knowledge corresponding to a domain.

In an embodiment, to learn associations between such text data (e.g., unstructured and/or structured text data) and knowledge graph defined above (e.g., a commonsense knowledge graph), model component 108 can employ a model that can comprise an encoder-decoder architecture that can have, for example, an encoder and at least two decoders. In this embodiment, model component 108 can employ such a model to learn the associations using at least one of an unsupervised learning technique or a supervised learning technique. In this embodiment, to learn such associations, model component 108 can employ such a model defined above that can facilitate one or more translation tasks and/or translation cycles between the above defined text data and knowledge graph to enable dual learning (e.g., via an unsupervised learning technique and/or a supervised learning technique), by the model, of the above defined text data and one or more nodes and/or edges of the above defined knowledge graph. For example, such a model defined above can transfer a sentence to a path (also referred to herein as an "edge") of a commonsense knowledge graph and further generate text data (e.g., a word, a sentence, a paragraph, and/or other text data) from the commonsense knowledge graph using unsupervised training. It should be appreciated that by employing such a model defined above to learn associations between the above defined text data and knowledge graph in accordance with one or more embodiments of the subject disclosure, dual learning bridge system 102 and/or model component 108 can thereby provide a distinct and/or advantageous approach to knowledge graph generation compared to existing technologies utilizing geometric deep learning.

Translation component 110 can use the above defined model to bidirectionally translate second text data and one or more knowledge graph paths based on the associations. For example, model component 108 can employ the above defined model to learn the associations using an unsupervised learning technique and cyclical translation of text data and knowledge graph paths of a knowledge graph and/or the second text data and the one or more knowledge graph paths. In this example, translation component 110 can use the model to bidirectionally translate the second text data and one or more knowledge graph paths based on the associations. For instance, translation component 110 can use the model to: translate the second text data to the one or more knowledge graph paths based on the associations; and/or translate the one or more knowledge graph paths to the second text data based on the associations.

Graph component 202 can generate a second knowledge graph using the above described knowledge graph and/or one or more knowledge graph paths. For example, graph component 202 can employ a knowledge graph generation process, application, and/or software that can facilitate generation of such a second knowledge graph using the above described knowledge graph and/or one or more knowledge graph paths.

In an example, graph component 202 can generate a second knowledge graph using such one or more knowledge graph paths, where the second knowledge graph can comprise a new (e.g., not previously generated) and/or unique knowledge graph (e.g., a new and/or unique commonsense knowledge graph). In another example, graph component 202 can generate a second knowledge graph using the above defined knowledge graph and/or the one or more knowledge graph paths, where the second knowledge graph can comprise, for example, an augmented version of the above defined knowledge graph (e.g., a completed and/or extended version of the above defined knowledge graph). In various embodiments, by generating such a second knowledge graph using the above described knowledge graph and/or one or more knowledge graph paths, dual learning bridge system 102 and/or graph component 202 can thereby provide: a reduced processing workload associated with generating the second knowledge graph; a reduced build time associated with generating the second knowledge graph; enrichment of the knowledge graph and/or the second knowledge graph; and/or completion of the knowledge graph or the second knowledge graph.

Figure 3:
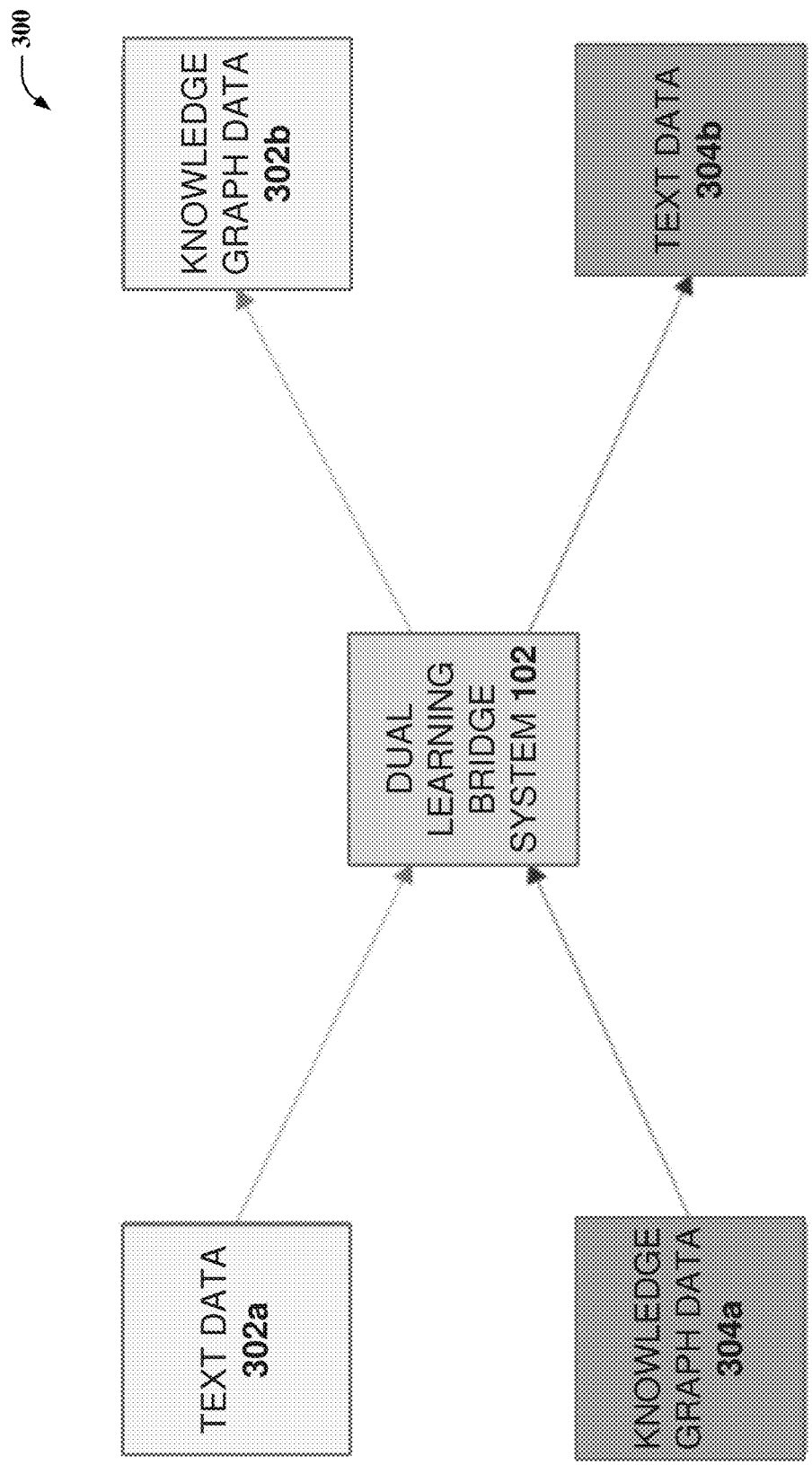

FIG. 3 illustrates an example, non-limiting diagram 300 that can facilitate a dual learning bridge between text and a knowledge graph in accordance with one or more embodiments described herein. Repetitive description of like elements and/or processes employed in respective embodiments is omitted for sake of brevity.

Diagram 300 illustrates the dual learning process that can be implemented by dual learning bridge system 102 and/or one or more components thereof in accordance with one or more embodiments of the subject disclosure. For example, diagram 300 illustrates how dual learning bridge system 102 and/or one or more components thereof can implement the dual learning process described herein in accordance with one or more embodiments of the subject disclosure to translate text data 302a (e.g., one or more text descriptions) into knowledge graph data 302b (e.g., a knowledge graph, one or more nodes of a knowledge graph, one or more edges of a knowledge graph, and/or other knowledge graph data). In this example, diagram 300 further illustrates how dual learning bridge system 102 and/or one or more components thereof can implement the dual learning process described herein in accordance with one or more embodiments of the subject disclosure to translate knowledge graph data 304a (e.g., a knowledge graph, one or more nodes of a knowledge graph, one or more edges of a knowledge graph, and/or other knowledge graph data) into text data 304b (e.g., one or more text descriptions).

Figure 4:
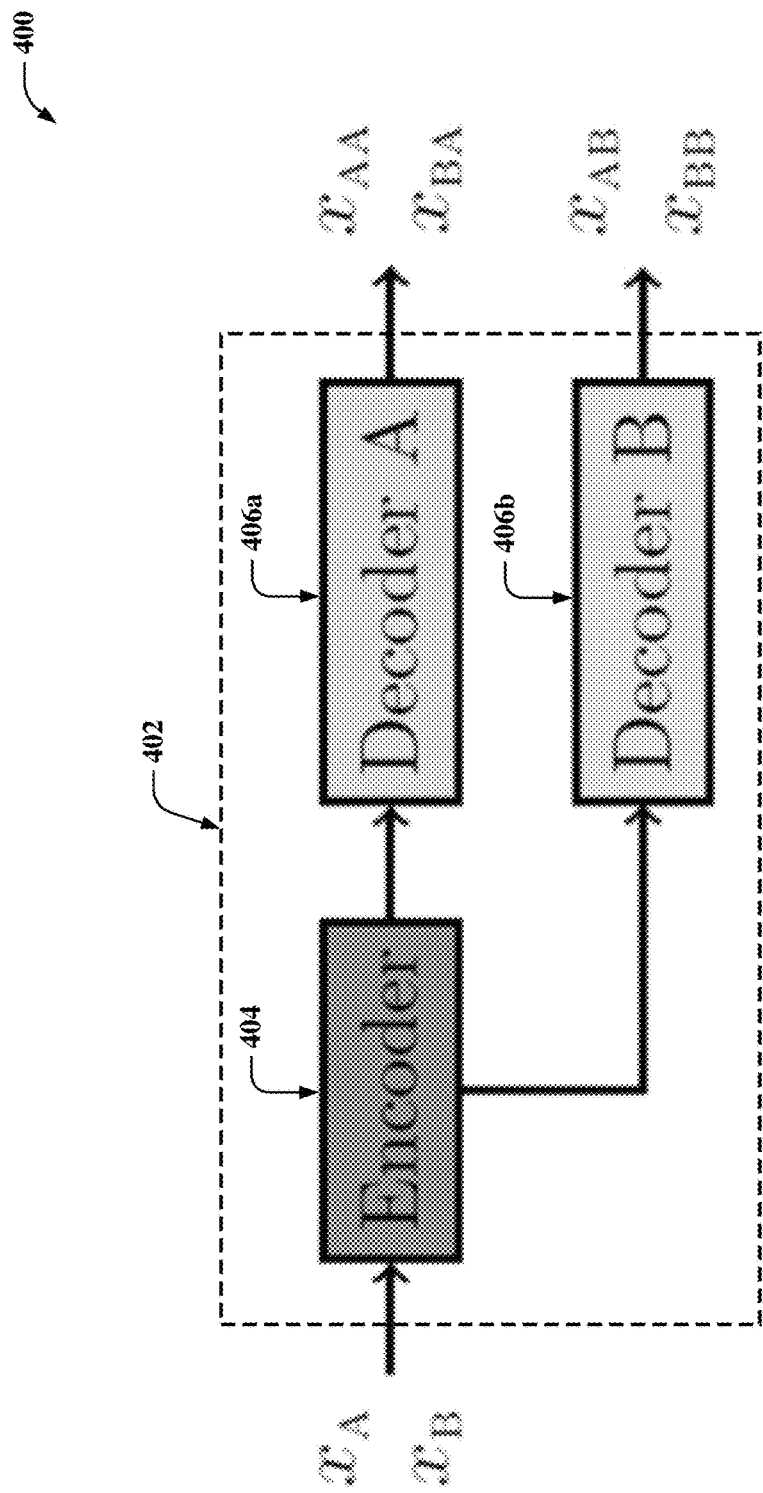

FIG. 4 illustrates an example, non-limiting diagram 400 that can facilitate a dual learning bridge between text and a knowledge graph in accordance with one or more embodiments described herein. Repetitive description of like elements and/or processes employed in respective embodiments is omitted for sake of brevity.

Diagram 400 illustrates an encoder-decoder architecture of a model 402 (also referred to herein and/or in the figures as "Dual Text and Knowledge Base" model or "DualTKB" model) comprising an encoder 404 (denoted as "Encoder" in FIG. 4) and decoders 406a, 406b (respectively denoted as "Decoder A" and "Decoder B" in FIG. 4). In accordance with one or more embodiments of the subject disclosure, dual learning bridge system 102 and/or one or more components thereof can employ model 402 to perform one or more of the operations described above with reference to the example embodiments illustrated in FIGS. 1, 2, and 3. For example, in accordance with one or more embodiments of the subject disclosure, dual learning bridge system 102 and/or one or more components thereof can employ model 402 to learn (e.g., via model component 108) associations between text data denoted in FIG. 4 as $x_A$ and knowledge graph data denoted in FIG. 4 as $x_B$ (e.g., knowledge graph paths) and/or to bidirectionally translate text data and one or more knowledge graph paths based on the associations.

As illustrated in FIG. 4, encoder 404 can project text $x_A$ and/or a path in a graph $x_B$ to a common high dimensional representation where it can be further passed through decoder 406a or decoder 406b that can either perform a reconstruction of the same modality (e.g., auto-encoding) $x_{AA}$ or $x_{BB}$, respectively, or perform the transfer to a different modality $x_{BA}$ or $x_{AB}$, respectively. In various embodiments, decoders 406a, 406b can share one or more properties and/or weights with one another. In various embodiments, encoder 404, decoder 406a, and/or decoder 406b can comprise, for example, a gated recurrent unit (GRU) model, a bidirectional encoder representations from transformers (BERT) model, a transformer model, and/or another model. In an embodiment, encoder 404 and decoders 406a, 406b can each comprise a GRU (e.g., constituting a GRU-GRU architecture). In another embodiment, encoder 404 can comprise a BERT and decoders 406a, 406b can each comprise a GRU (e.g., constituting a BERT-GRU architecture). In another embodiment, encoder 404 and decoders 406a, 406b can each comprise a transformer model (e.g., constituting a transformer-transformer architecture).

Existing systems comprising the same architecture and/or functionality as that of model 402 can be trained using a sequence-to-sequence (seq2seq) supervised learning process where paired text-path data is used to enable same- and cross-modality generation. However, many knowledge graph and/or knowledge base datasets do not have the correspondent pairs of text and path, and therefore require unsupervised training techniques. The example embodiment described below and depicted in FIG. 6 illustrates the training process that can be implemented by dual learning bridge system 102 and/or one or more components thereof to train model 402 to perform one or more of the operations described above with reference to the example embodiments illustrated in FIGS. 1, 2, and 3.

Figure 5A:
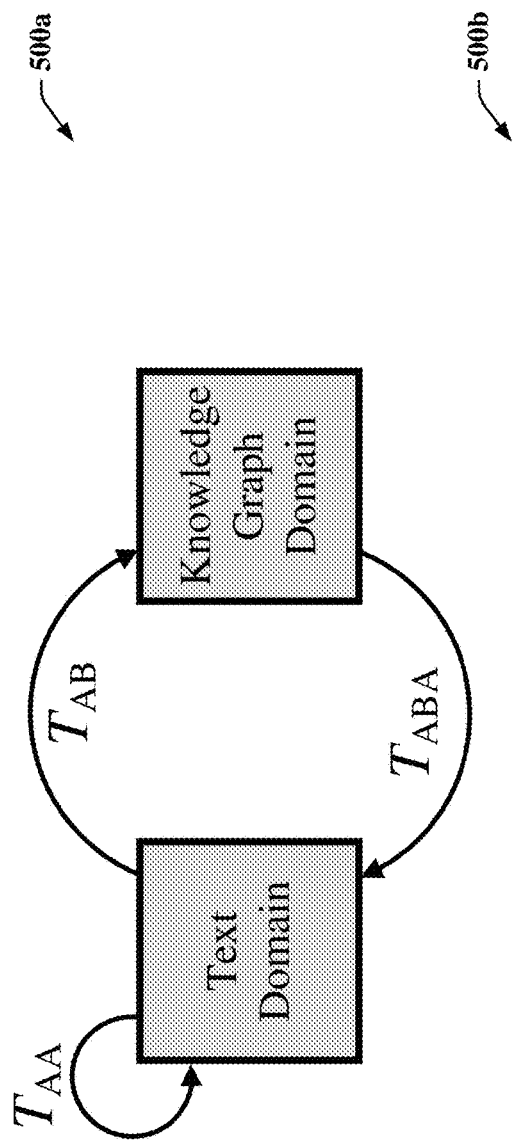
Figure 5B:
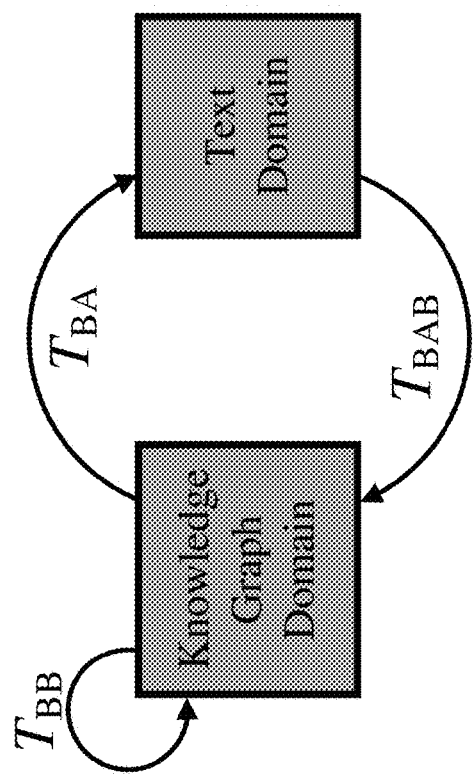

FIGS. 5A and 5B illustrate example, non-limiting diagrams 500a, 500b that can facilitate a dual learning bridge between text and a knowledge graph in accordance with one or more embodiments described herein. Repetitive description of like elements and/or processes employed in respective embodiments is omitted for sake of brevity.

Diagrams 500a, 500b illustrate translation cycles that can be implemented by dual learning bridge system 102 and/or one or more components thereof in accordance with one or more embodiments of the subject disclosure. For example, diagram 500a illustrates how dual learning bridge system 102 and/or one or more components thereof can translate text data from a text domain to the same text domain (represented by $T_{AA}$ in FIG. 5A), from the text domain to a knowledge graph domain (represented by $T_{AB}$ in FIG. 5A), and/or from the knowledge graph domain back to the text domain (represented by $T_{ABA}$ in FIG. 5A). In another example, diagram 500b illustrates how dual learning bridge system 102 and/or one or more components thereof can translate knowledge graph data (e.g., paths) from a knowledge graph domain to the same knowledge graph domain (represented by $T_{BB}$ in FIG. 5B), from the knowledge graph domain to a text domain (represented by $T_{BA}$ in FIG. 5B), and/or from the text domain back to the knowledge graph domain (represented by $T_{BAB}$ in FIG. 5B).

Figure 6:
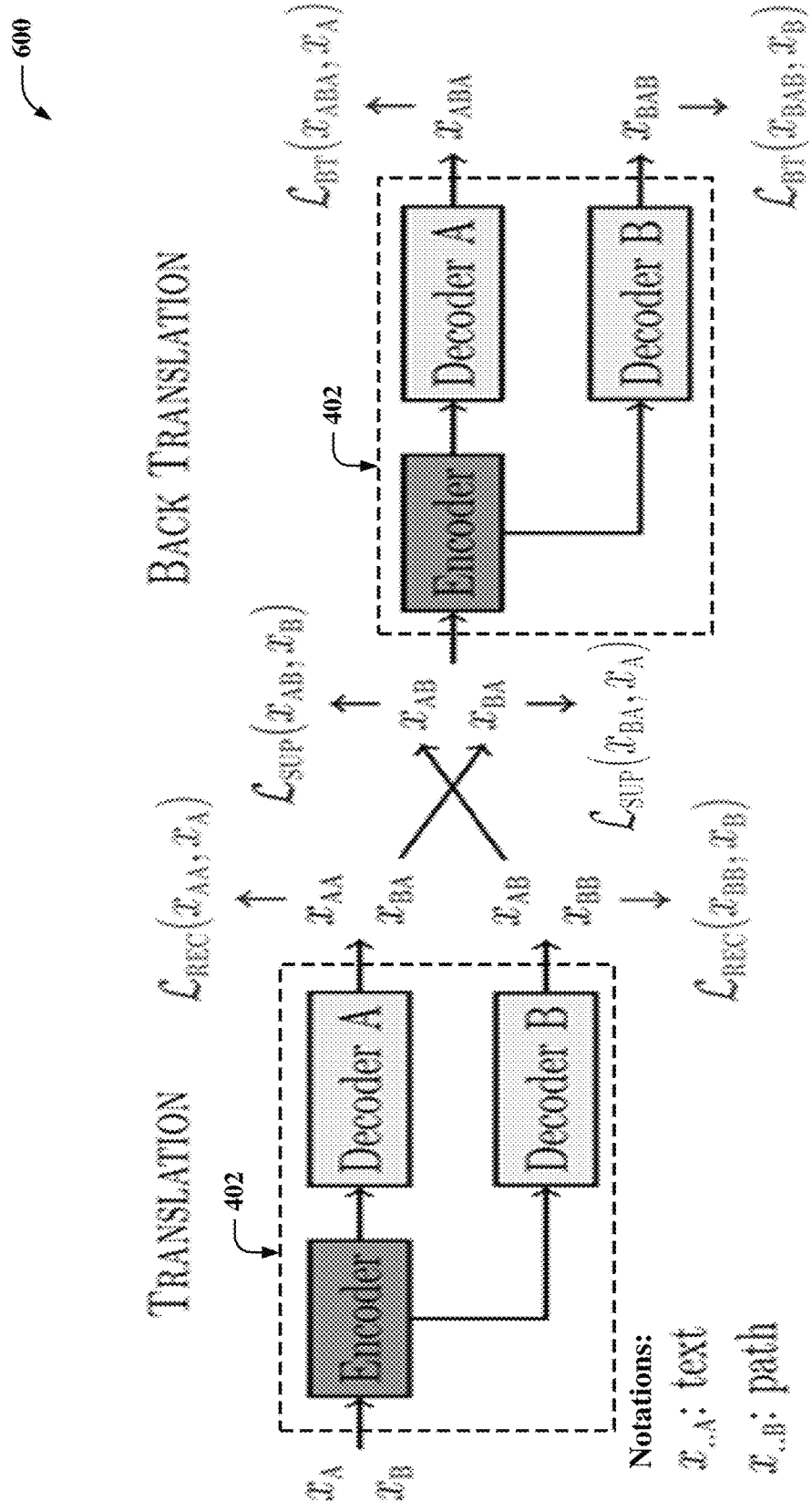

FIG. 6 illustrates an example, non-limiting diagram 600 that can facilitate a dual learning bridge between text and a knowledge graph in accordance with one or more embodiments described herein. Repetitive description of like elements and/or processes employed in respective embodiments is omitted for sake of brevity.

Diagram 600 illustrates a dual learning training process that can be implemented by dual learning bridge system 102 and/or one or more components thereof to train a model such as, for instance, model 402 to perform one or more of the operations described above with reference to the example embodiments illustrated in FIGS. 1-5B. In embodiments where no parallel data is available (e.g., no paired text-path data is available), dual learning bridge system 102 and/or one or more components thereof can augment the above described traditional seq2seq supervised training process, which involves use of such parallel data, with an unsupervised training process as illustrated in diagram 600 of FIG. 6.

Dual Learning

The dual learning training process illustrated in diagram 600 can be implemented by dual learning bridge system 102 and/or one or more components thereof to build model 402 by performing two distinct but complementary generative tasks depicted in diagram 600.

As illustrated in diagram 600, the training process that can be used to train model 402 in accordance with one or more embodiments of the subject disclosure can comprise a translation stage ($\mathscr{L}_{REC}$, $\mathscr{L}_{SUP}$) that can be followed by a back-translation stage ($\mathscr{L}_{BT}$). The training process illustrated in diagram 600 can employ supervised and/or unsupervised training technique(s) and/or can use supervised and/or unsupervised data. To perform such a training process, dual learning bridge system 102 and/or one or more components thereof can complete the following tasks.

Tasks for Unsupervised Training
text→text: Given a sentence $x_A$, reconstruct it back $x_{AA}=T_{AA}(x_A)$.
path→path: Given a knowledge graph path $x_B$, reconstruct it back $x_{BB}=T_{BB}(x_B)$.
path→text→path: Given a knowledge graph path $x_B$, translate into a sentence $x_{BA}$ and back-translate to original path $x_{BAB}=T_{AB}(x_{BA})=T_{AB}(T_{BA}(x_B))=T_{BAB}(x_B)$.
text→path→text: Given a sentence $x_A$, translate into a path $x_{AB}$ and back-translate to original sentence $x_{ABA}=T_{BA}(x_{AB})=T_{BA}(T_{AB}(x_A))=T_{ABA}(x_A)$.

Tasks for Supervised Training
text→path: Given a sentence $x_A$, generate a path $x_{AB}=T_{AB}(x_A)$.
path→text: Given a knowledge graph path $x_B$, generate a descriptive sentence $x_{BA}=T_{BA}(x_B)$.

Continuing with the above described text→path task: Given a sentence $x_A$, generate a path $x_{AB}$ with well-formed entities and relation, that can either belong to an already constructed knowledge graph, or extend it in a factually meaningful way. This conditional generation is framed as a translation task referred to as $T_{AB}$ where $x_{AB}=T_{AB}(x_A)$.

Continuing with the above described path→text task: Given a knowledge graph path $x_B$, generate a descriptive sentence $x_A$, coherently merging entities and relation from the path. This conditional generation is a translation task referred to as $T_{BA}$, where $x_{BA}=T_{BA}(x_B)$.

From the above two tasks follows the definition of back-translation tasks $T_{BAB}$ (path→text→path) and $T_{ABA}$ (text→path→text). Reconstruction tasks $T_{AA}$ and $T_{BB}$ are trivially defined as generating the same text and/or path from itself. In an unsupervised setting, where sentences $x_A$ and paths $x_B$ are not paired, the reconstruction tasks $T_{AA}$, $T_{BB}$ and back-translation tasks $T_{ABA}$, $T_{BAB}$ are the only ones available to define training losses. The back-translation tasks define the so-called cycle and/or consistency losses, which implicitly control the quality of the first transfers ($T_{AB}$, $T_{BA}$), by checking the reconstruction after the second transfers ($T_{ABA}$, $T_{BAB}$). By themselves, these cycle losses are effective in training a transfer model. However, even a relatively small weak supervision (e.g., by pairing some $x_A$ to $x_B$) can significantly improve performance of model 402.

As shown in FIG. 4, model 402 uses an encoder-decoder architecture with a common encoder (e.g., encoder 404) and two decoders (e.g., decoder 406a that can generate sentences $x_A$, and decoder 406b that can generate paths $x_B$). The reason model 402 can employ a single encoder (e.g., encoder 404) is to force the embeddings of path and text to lie in the same space, encoding a fact regardless of modality. It then becomes the job of each specific decoder (e.g., decoder 406a and decoder 406b) to recover either one of the modalities. In some embodiments, decoders 406a, 406b can share the same architecture, but not their parameters.

Unsupervised and/or Relatively Weakly-Supervised Training

As a data source, dual learning bridge system 102 and/or one or more components thereof can use a standard knowledge graph dataset comprising, for example, a list of commonsense fact sentences (e.g., CN-600K). Dual learning bridge system 102 and/or one or more components thereof can obtain a weakly-supervised dataset by performing fuzzy matching of sentences $x_A$ to paths $x_B$. Dual learning bridge system 102 and/or one or more components thereof can map each sentence to a list of paths, and each path to a list of sentences. Note that knowledge graph data and text dataset do not align exactly; noise and mislabeling are inherently present. Despite these constraints, dual learning bridge system 102 and/or one or more components thereof can investigate the effects of weak supervision on model performance (e.g., during training), and vary the amount of it by changing the fraction of available paired data.

Model 402

Given a dataset X of paths and sentences, let $x^k_t$ be its k-th random sample of type t, for k=1, ..., N and type t∈{A, B}, where $x_A$ is a sentence and $x_B$ is a path in a knowledge graph. Given the input $x^k_t$ to model 402, the corresponding generated output can be denoted as $x^k_{tt'}$, where tt' is the transfer direction, that is, tt'∈{AA, AB, BB, BA}. For example, given path $x^k_B$, $x^k_{BA}=T_{BA}(x^k_B)$ denotes the corresponding generated sentence. Similarly, given $x^k_{tt'}$ as input, $x^k_{tt't''}$ denotes additional possible transfer directions, out of which tt't''∈{ABA, BAB} are of interest, as they represent the back-translations of a sample from a type t back to itself, since t''=t. Given input sentence $x^k_{BA}$, $x^k_{BAB}$ denotes its generated back-translation such that $x^k_{BAB}=T_{AB}(x^k_{BA})=T_{AB}(T_{BA}(x^k_B))$. In embodiments where model 402 can perform perfect generation and back-translation, model 402 can yield $x^k_{BAB}=x^k B$ as $T_{AB}(T_{BA}(x))$ would be the identity function. To reduce clutter, dual learning bridge system 102 and/or one or more components thereof can drop the dataset index k from the notations.

Loses

Dual learning bridge system 102 and/or one or more components thereof can employ one or more types of losses in performing the dual learning training process illustrated in FIG. 6.

Total loss can be defined as $\mathcal{L} = \mathcal{L}_{REC} + \mathcal{L}_{BT} + \mathcal{L}_{SUP}$, which can be minimized (e.g., to the relatively lowest value) by dual learning bridge system 102 and/or one or more components thereof, where:

$\mathcal{L}_{REC}$ (annotated in diagram 600 as "$\mathcal{L}_{REG}$") denotes the reconstruction loss that controls the quality of the autoencoding process and can be defined as $$\mathcal{L}_{REC} = \mathbb{E}_{x_A \sim X}[-\log p_{AA}(x_A)] + \mathbb{E}_{x_B \sim X}[-\log p_{BB}(x_B)]$$

where $p_{AA}(x_A)$ denotes the distribution corresponding to the reconstructed sentences $x_{AA}=T_{AA}(x_A)$, and $p_{BB}(x_B)$ denotes the distribution corresponding to paths $x_{BB}=T_{BB}(x_B)$. To enable model 402 to perform transfers, dual learning bridge system 102 and/or one or more components thereof can also employ the so-called back-translation or cycle loss described below.

$\mathcal{L}_{BT}$, (annotated in diagram 600 as "$\mathcal{L}_{BT}$") denotes the back-translation loss and in embodiments where no supervised data is available and/or where the data available is partially supervised, this loss ensures that when the transferred modality (e.g., text or path) is back-fed into model 402 and transferred again (e.g., translated again), the result matches the original input. The back-translation loss can be defined as $$\mathcal{L}_{BT} = \mathbb{E}_{x_A \sim X}[-\log p_{ABA}(x_A | x_{AB})] + \mathbb{E}_{x_B \sim X}[-\log p_{BAB}(x_B | x_{BA})]$$

Unsupervised training minimizes the combined loss $\mathcal{L}_{REC} + \mathcal{L}_{BT}$. In embodiments where supervised data is available, dual learning bridge system 102 and/or one or more components thereof can additionally impose the below described supervision loss for the paired data.

$\mathcal{L}_{SUP}$ (annotated in diagram 600 as "$\mathcal{L}_{SUP}$") denotes the supervised training loss and in embodiments where supervised data is available, this loss measures the cross-modality transfer and can be defined as $$\mathcal{L}_{SUP} = \mathbb{E}_{x_A, x_B \sim X}[-\log p_{AB}(x_B | x_A)] + \mathbb{E}_{x_A, x_B \sim X}[-\log p_{BA}(x_A | x_B)]$$

Supervised training minimizes the combined loss $\mathcal{L}_{REC} + \mathcal{L}_{BT} + \mathcal{L}_{SUP}$. In some embodiments, dual learning bridge system 102 and/or one or more components thereof can evaluate the impact of $\mathcal{L}_{REC}$, $\mathcal{L}_{BT}$, and/or $\mathcal{L}_{SUP}$, on training with an ablation study (e.g., illustrated in FIG. 12). In embodiments where the supervised data is limited, that is, the sentence-path correspondence is only known for some pairs $(x_A, x_B)$, the loss in $\mathcal{L}_{SUP}$ can be adjusted accordingly and averaged only over the available pairs. In these embodiments, such a modification can enable dual learning bridge system 102 and/or one or more components thereof to examine the effect of the amount of supervision on the performance of model 402.

In multiple embodiments, to evaluate a path generated by model 402, dual learning bridge system 102 and/or one or more components thereof can employ a conventional knowledge graph and/or knowledge base completion task where the goal is to maximize (e.g., obtain the relatively highest value of) the validity score of a tail entity $e_t$ given the pair $(e_h, r)$. In these embodiments, dual learning bridge system 102 and/or one or more components thereof can further employ a Graph Edit Distance (GED) process (e.g., a GED algorithm) to examine the quality of a generated graph as a whole. In multiple embodiments, to evaluate text generated by model 402, dual learning bridge system 102 and/or one or more components thereof can employ traditional natural language processing (NLP) metrics such as, for example, a bilingual evaluation understudy (BLEU) metric (e.g., the BLEU score), a recall-oriented understudy for gisting evaluation (ROUGE) metric (e.g., the ROUGE score), and/or another metric.

The example embodiment depicted in FIG. 6 illustrates a dual learning training process of model 402 with translation and back-translation represented as a sequence of steps. Encoder 404 and decoders 406a, 406b can be shared for both the translation and back-translation steps. Encoder 404 can provide a representation of inputs $x_A$ (e.g., text) and $x_B$ (e.g., path) in a common embedding space. Decoders 406a, 406b can comprise specialized decoders that can respectively generate only sentences and paths from such embeddings. In the dual learning training process depicted in FIG. 6, losses can be indicated close to the generated values they involve.

Reconstruction loss $\mathcal{L}_{REC}$ and/or back-translation loss $\mathcal{L}_{BT}$ are available in unsupervised learning, with $\mathcal{L}_{SUP}$ only available in supervised learning. Generation of $x_{ABA}$ from $x_A$ means two passes through model 402. First pass with $x_A$ as input. Second pass with $x_{AB}=T_{AB}(x_A)$. The same model 402 can accommodate path and/or text generation.

Teacher Forcing and Data Pre-Processing

In performing the above described dual learning training process, dual learning bridge system 102 and/or one or more components thereof can provide a model being trained with ground truth tokens, for example, 20 percent (%) of the time and use model output otherwise. For paths, dual learning bridge system 102 and/or one or more components thereof can mask path component (e.g., head or tail), for example, 50% of the time. For text, dual learning bridge system 102 and/or one or more components thereof can mask randomly selected words, for example, 10% of the time.

FIG. 7 illustrates an example, non-limiting diagram 700 that can facilitate a dual learning bridge between text and a knowledge graph in accordance with one or more embodiments described herein. Repetitive description of like elements and/or processes employed in respective embodiments is omitted for sake of brevity.

Diagram 700 illustrates text to knowledge graph (e.g., text to path) translation results that can be generated by dual learning bridge system 102 and/or one or more components thereof in accordance with one or more embodiments of the subject disclosure. For example, in accordance with one or more embodiments of the subject disclosure, dual learning bridge system 102 and/or one or more components thereof can generate knowledge graph 702 using sentences 704 as input to model 402. That is, for instance, dual learning bridge system 102 and/or one or more components thereof can independently transfer (e.g., translate) each sentence of sentences 704 to a path of knowledge graph 702, where such path comprise an edge tuple ($e_h$, r, $e_t$). In this example, dual learning bridge system 102 and/or one or more components thereof can generate the whole path at once, with eh, r, and et taking a free-form not restricted to any predefined sets of entities or relations. It should be appreciated that this contrasts with many existing technologies operating on a limited discrete set of already-defined edges in a dense conventional knowledge graph and/or knowledge base.

Figure 8:
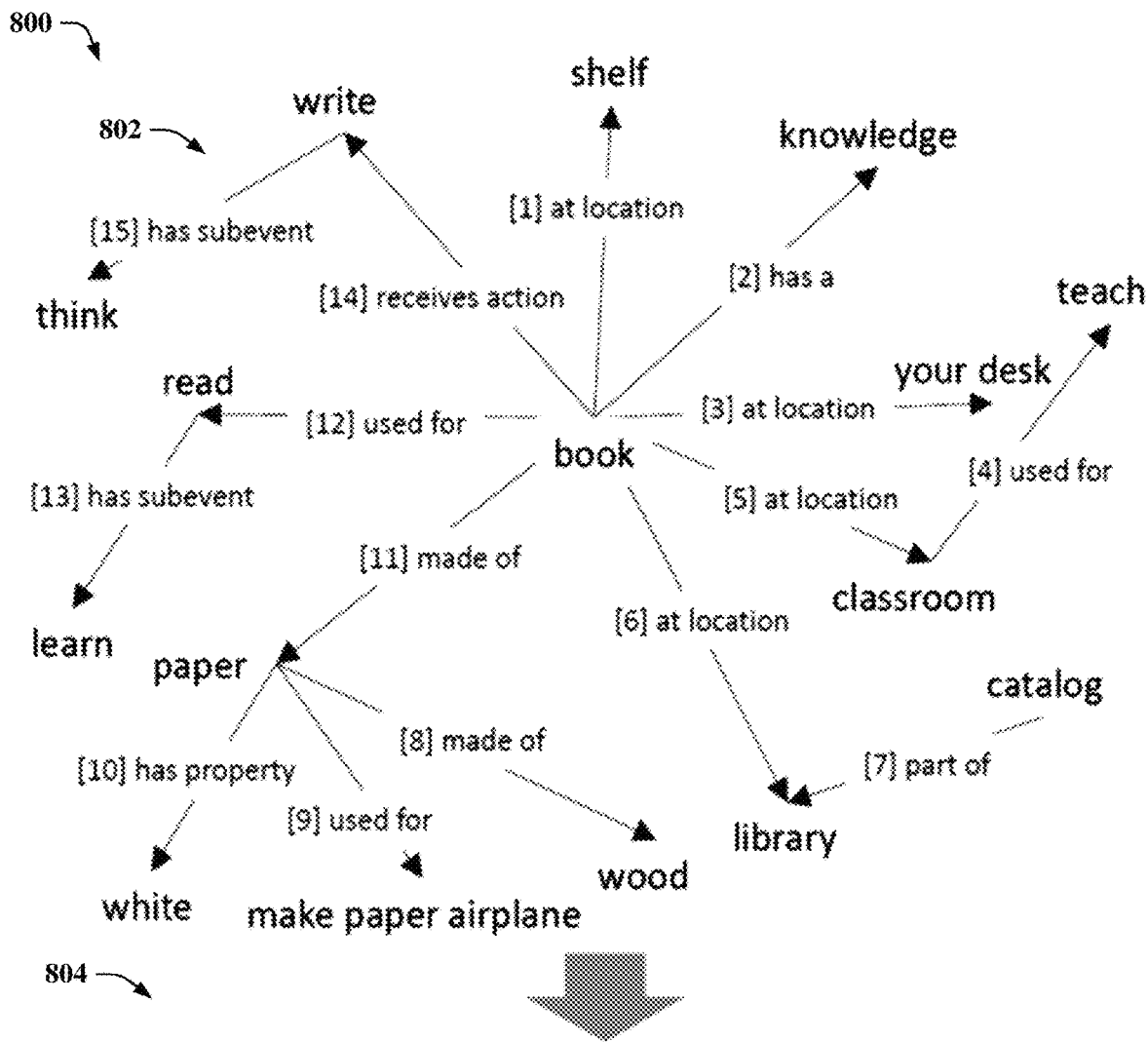

FIG. 8 illustrates an example, non-limiting diagram 800 that can facilitate a dual learning bridge between text and a knowledge graph in accordance with one or more embodiments described herein. Repetitive description of like elements and/or processes employed in respective embodiments is omitted for sake of brevity.

Diagram 800 illustrates knowledge graph to text (e.g., path to text) translation results that can be generated by dual learning bridge system 102 and/or one or more components thereof in accordance with one or more embodiments of the subject disclosure. For example, in accordance with one or more embodiments of the subject disclosure, dual learning bridge system 102 and/or one or more components thereof can generate sentences 804 using knowledge graph 802 (e.g., using paths and/or nodes of knowledge graph 802) as input to model 402. That is, for instance, dual learning bridge system 102 and/or one or more components thereof can convert (e.g., transfer and/or translate) each path and/or node in knowledge graph 8/02 to a sentence of sentences 804. It should be appreciated that dual learning bridge system 102 and/or one or more components thereof can generate sentences 804 comprising overall diversity in the sentence styles. Moreover, it should be further appreciated that sentences 804 illustrate how the generation process that can be implemented by dual learning bridge system 102 and/or one or more components thereof in accordance with one or more embodiments of the subject disclosure is more sophisticated than just a trivial path flattening (e.g., merging text from all edge parts followed by minimal edits). Therefore, it should be appreciated that dual learning bridge system 102 can be a part of a more sophisticated system that converts knowledge graphs to a coherent textual story and/or vice versa.

FIG. 9 illustrates an example, non-limiting diagram 900 that can facilitate a dual learning bridge between text and a knowledge graph in accordance with one or more embodiments described herein. Repetitive description of like elements and/or processes employed in respective embodiments is omitted for sake of brevity.

Diagram 900 illustrates experimental results obtained by implementing dual learning bridge system 102 in accordance with one or more embodiments of the subject disclosure. Diagram 900 illustrates conventional and generative knowledge graph completion results for a ConceptNet test set for (e.g., filtered) mean reciprocal rank (MRR), number of hits at 1 (denoted as "HITS@1" in FIG. 9), number of hits at 3 (denoted as "HITS@3" in FIG. 9), number of hits at 10 (denoted as "HITS@10" in FIG. 9), and graph edit distance (GED) metrics. Models in training that have the relatively best MRR evaluations can be selected for testing (e.g., $D_{UAL}TKB_{GRU-GRU}$). Models annotated with an asterisk (*) can be selected based on relatively best BLEU2 score for BA text generation task. In diagram 900, HITS@1, HITS@3, and HITS@10 respectively denote a top-1, top-3, and top-10 accuracy (e.g., number of times there is a hit in the top 1, top 3, and top 10, respectively, or the proportion of correct candidates ranked in the top 1, top 3, and top 10, respectively). Supervision ratio is denoted as ρ in diagram 900.

FIG. 10 illustrates an example, non-limiting diagram 1000 that can facilitate a dual learning bridge between text and a knowledge graph in accordance with one or more embodiments described herein. Repetitive description of like elements and/or processes employed in respective embodiments is omitted for sake of brevity.

Diagram 1000 illustrates experimental results obtained by implementing dual learning bridge system 102 in accordance with one or more embodiments of the subject disclosure. Diagram 1000 illustrates BA text generation evaluation results for BLEU2 (denoted as $B_2$ in FIG. 10), BLEU3 (denoted as $B_3$ in FIG. 10), RougeL ($R_L$), and F1 BERTscore (denoted as $B_{F1}$ in FIG. 10). Models depicted in diagram 1000 correspond to those illustrated in diagram 900 (e.g., $D_{UAL}TKB_{GRU-GRU}$, $D_{UAL}TKB_{BERT-GRU}$, and $DUALTKB_{Trans-Trans}$). Models annotated with an asterisk (*) can be selected based on relatively best $B_2$ scores.

Figure 11:
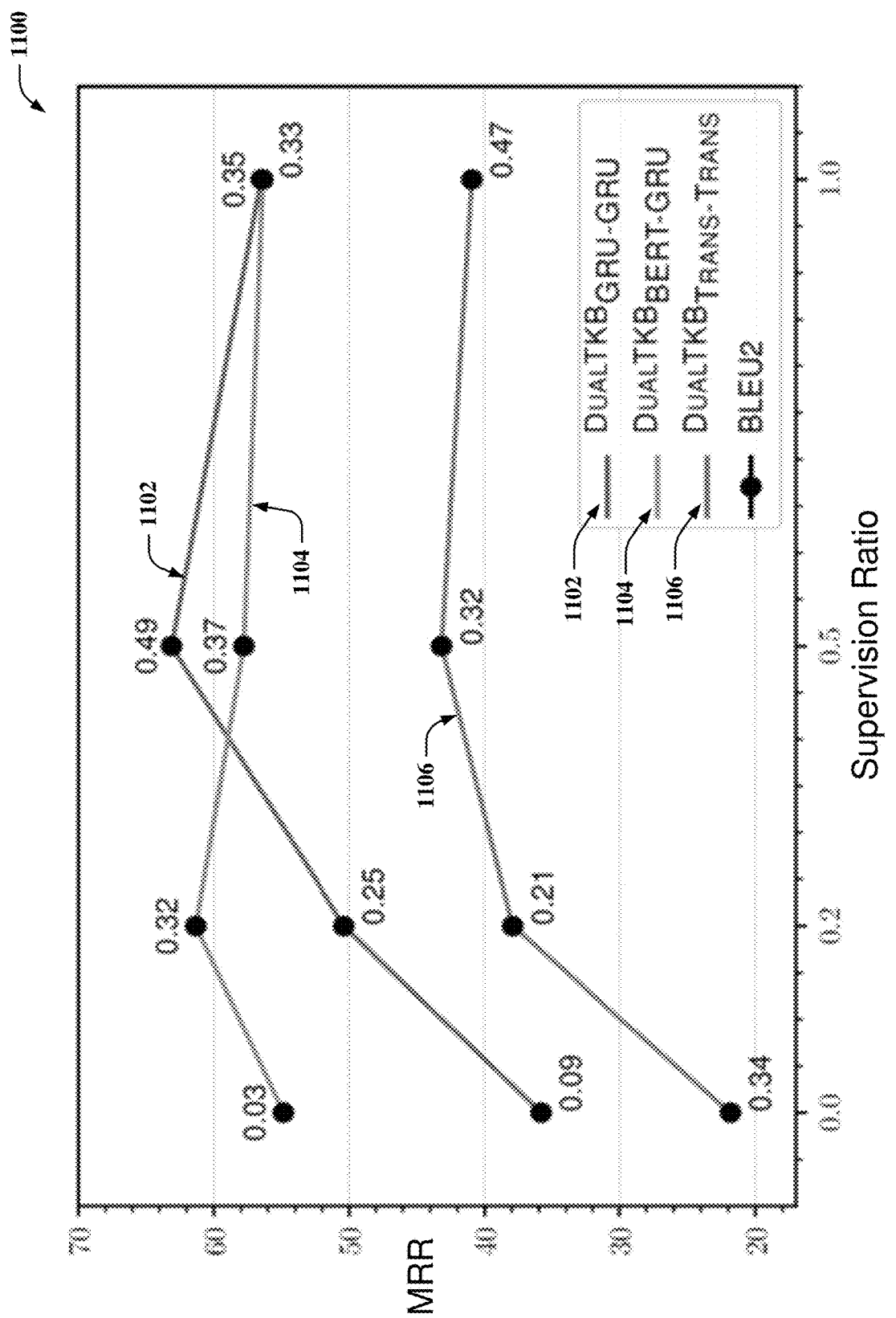
FIG. 11 illustrates an example, non-limiting graph that can facilitate a dual learning bridge between text and a knowledge graph in accordance with one or more embodiments described herein.

FIG. 11 illustrates an example, non-limiting graph 1100 that can facilitate a dual learning bridge between text and a knowledge graph in accordance with one or more embodiments described herein. Repetitive description of like elements and/or processes employed in respective embodiments is omitted for sake of brevity.

Graph 1100 illustrates plots 1102, 1104, 1106 of experimental results obtained by implementing dual learning bridge system 102 in accordance with one or more embodiments of the subject disclosure. Plots 1102, 1104, 1106 depict the MRR and BLEU2 performance of each model (e.g., $D_{UAL}TKB_{GRU-GRU}$, $D_{UAL}TKB_{BERT-GRU}$, and $D_{UAL}TKB_{Trans-Trans}$) evaluated with supervision ratios of 0, 0.2, 0.8 and 1.0. As illustrated in graph 1100, after gains from slight supervision, full supervision degrades performances, except for BLEU2 for the $D_{UAL}TKB_{Trans-Trans}$ models.

FIG. 12 illustrates an example, non-limiting diagram 1200 that can facilitate a dual learning bridge between text and a knowledge graph in accordance with one or more embodiments described herein. Repetitive description of like elements and/or processes employed in respective embodiments is omitted for sake of brevity.

Diagram 1200 illustrates experimental results obtained by implementing dual learning bridge system 102 in accordance with one or more embodiments of the subject disclosure. Diagram 1200 illustrates ablation study results on different sets of losses (e.g., $\mathscr{L}_{REC}+\mathscr{L}_{BT}+\mathscr{L}_{SUP}$, $\mathscr{L}_{BT}+\mathscr{L}_{SUP}$, $\mathscr{L}_{BT}+\mathscr{L}_{REC}$, and $\mathscr{L}_{REC}+\mathscr{L}_{SUP}$) across various models (e.g., $D_{UAL}TKB_{GRU-GRU}$, $D_{UAL}TKB_{BERT-GRU}$, and $D_{UAL}TKB_{Trans-Trans}$).

Figure 13:
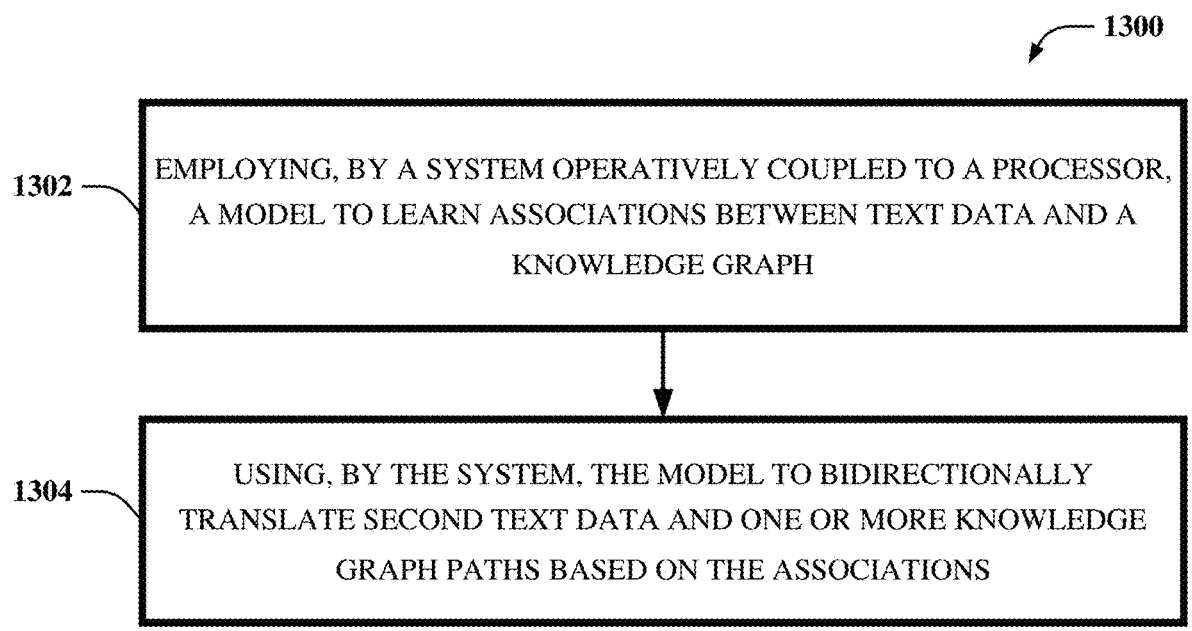
FIG. 13 illustrates a flow diagram of an example, non-limiting computer-implemented method that can facilitate a dual learning bridge between text and a knowledge graph in accordance with one or more embodiments described herein.

FIG. 13 illustrates a flow diagram of an example, non-limiting computer-implemented method 1300 that can facilitate a dual learning bridge between text and a knowledge graph in accordance with one or more embodiments described herein. Repetitive description of like elements and/or processes employed in respective embodiments is omitted for sake of brevity.

At 1302, computer-implemented method 1300 can comprise employing, by a system (e.g., dual learning bridge system 102 and/or model component 108) operatively coupled to a processor (e.g., processor 106), a model (e.g., model 402) to learn associations between text data and a knowledge graph.

At 1304, computer-implemented method 1300 can comprise using, by the system (e.g., dual learning bridge system 102 and/or translation component 110), the model to bidirectionally translate second text data and one or more knowledge graph paths based on the associations.

Dual learning bridge system 102 can be associated with various technologies. For example, dual learning bridge system 102 can be associated with knowledge base and/or knowledge graph technologies, automated generation of knowledge base and/or knowledge graph technologies, ML and/or AI model technologies, cloud computing technologies, and/or other technologies.

Dual learning bridge system 102 can provide technical improvements to systems, devices, components, operational steps, and/or processing steps associated with the various technologies identified above. For example, dual learning bridge system 102 can employ a model to learn associations between text data and a knowledge graph; and/or use the model to bidirectionally translate second text data and one or more knowledge graph paths based on the associations. In this example, dual learning bridge system 102 can further generate a second knowledge graph using the knowledge graph and/or the one or more knowledge graph paths, thereby providing: a reduced processing workload associated with generating the second knowledge graph (e.g., a new knowledge graph and/or an expanded version of the original knowledge graph); a reduced build time associated with generating the second knowledge graph; enrichment of the knowledge graph or the second knowledge graph; and/or completion of the knowledge graph or the second knowledge graph. In this example, it should be appreciated that dual learning bridge system 102 can enable automatic construction and/or expansion (e.g., enrichment) a knowledge graph and/or a knowledge base from text data (e.g., sentences), as well as perform the reverse operation of knowledge graph conversion to coherent textual descriptions.

Dual learning bridge system 102 can provide technical improvements to a processing unit associated with dual learning bridge system 102. For example, as described above, by using the learned associations between text data and a knowledge graph to generate a second knowledge graph using the knowledge graph and/or the one or more knowledge graph paths, dual learning bridge system 102 can thereby provide a reduced processing workload associated with generating the second knowledge graph (e.g., a new knowledge graph and/or an expanded version of the original knowledge graph). In this example, by reducing such a processing workload in generating the second knowledge graph, dual learning bridge system 102 can thereby reduce the computational cost of a processor (e.g., processor 106) that can generate the second knowledge graph and/or improve the performance of such a processor.

A practical application of dual learning bridge system 102 is that it can be implemented in one or more domains to automatically construct and/or expand (e.g., enrich) a knowledge graph and/or a knowledge base from text, as well as perform the reverse operation of knowledge graph conversion to coherent textual descriptions. For example, a practical application of dual learning bridge system 102 is that it can be implemented in, for instance, the medical industry to automatically construct and/or expand (e.g., enrich) a complex medication interaction graph using text from medical papers, as well as perform the reverse operation of converting such a complex medication interaction graph to a coherent and human-friendly textual description.

It should be appreciated that dual learning bridge system 102 provides a new approach driven by relatively new knowledge base and/or knowledge graph generation technologies. For example, dual learning bridge system 102 provides a new approach to automatically construct and/or expand (e.g., enrich) a knowledge graph using text and automatically perform the reverse operation of converting such a knowledge graph to a coherent textual description.

Dual learning bridge system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Dual learning bridge system 102 and/or components thereof, can be employed to solve new problems that arise through advancements in technologies mentioned above, employment of quantum computing systems, cloud computing systems, computer architecture, and/or another technology.

It is to be appreciated that dual learning bridge system 102 can utilize various combinations of electrical components, mechanical components, and circuitry that cannot be replicated in the mind of a human or performed by a human, as the various operations that can be executed by dual learning bridge system 102 and/or components thereof as described herein are operations that are greater than the capability of a human mind. For instance, the amount of data processed, the speed of processing such data, or the types of data processed by dual learning bridge system 102 over a certain period of time can be greater, faster, or different than the amount, speed, or data type that can be processed by a human mind over the same period of time.

According to several embodiments, dual learning bridge system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that dual learning bridge system 102 can include information that is impossible to obtain manually by an entity, such as a human user. For example, the type, amount, and/or variety of information included in dual learning bridge system 102, model component 108, translation component 110, and/or graph component 202 can be more complex than information obtained manually by an entity, such as a human user.

In some embodiments, dual learning bridge system 102 can be associated with a cloud computing environment. For example, dual learning bridge system 102 can be associated with cloud computing environment 1550 described below with reference to FIG. 15 and/or one or more functional abstraction layers described below with reference to FIG. 16 (e.g., hardware and software layer 1660, virtualization layer 1670, management layer 1680, and/or workloads layer 1690).

Dual learning bridge system 102 and/or components thereof (e.g., model component 108, translation component 110, graph component 202, and/or another component) can employ one or more computing resources of cloud computing environment 1550 described below with reference to FIG. 15 and/or one or more functional abstraction layers described below with reference to FIG. 16 to execute one or more operations in accordance with one or more embodiments of the subject disclosure described herein. For example, cloud computing environment 1550 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by dual learning bridge system 102 and/or components thereof to execute one or more operations in accordance with one or more embodiments of the subject disclosure described herein. For instance, dual learning bridge system 102 and/or components thereof can employ such one or more classical and/or quantum computing resources to execute one or more classical and/or quantum: mathematical function, calculation, and/or equation; computing and/or processing script; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
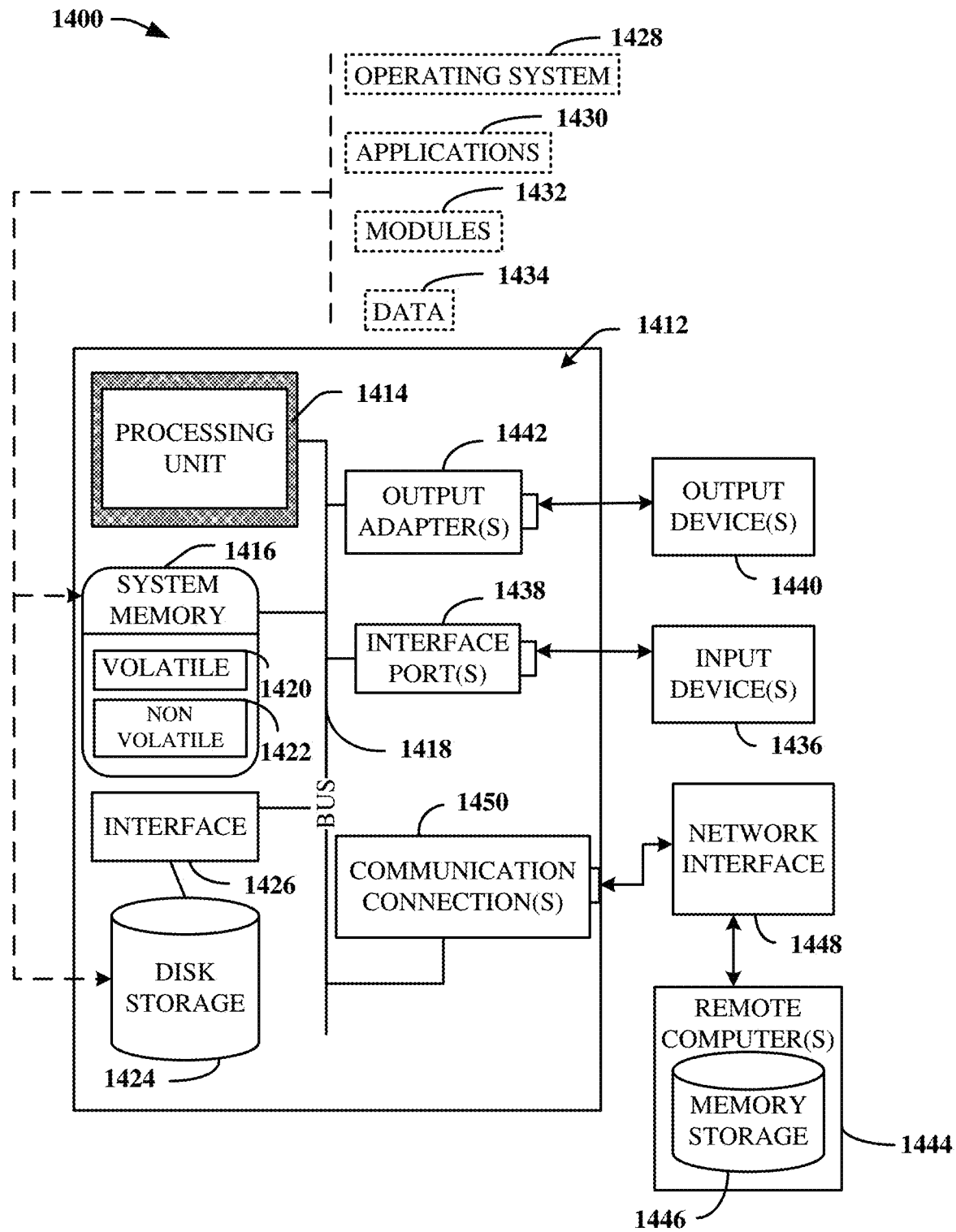
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity.

With reference to FIG. 14, a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media. To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412.

System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Figure 15:
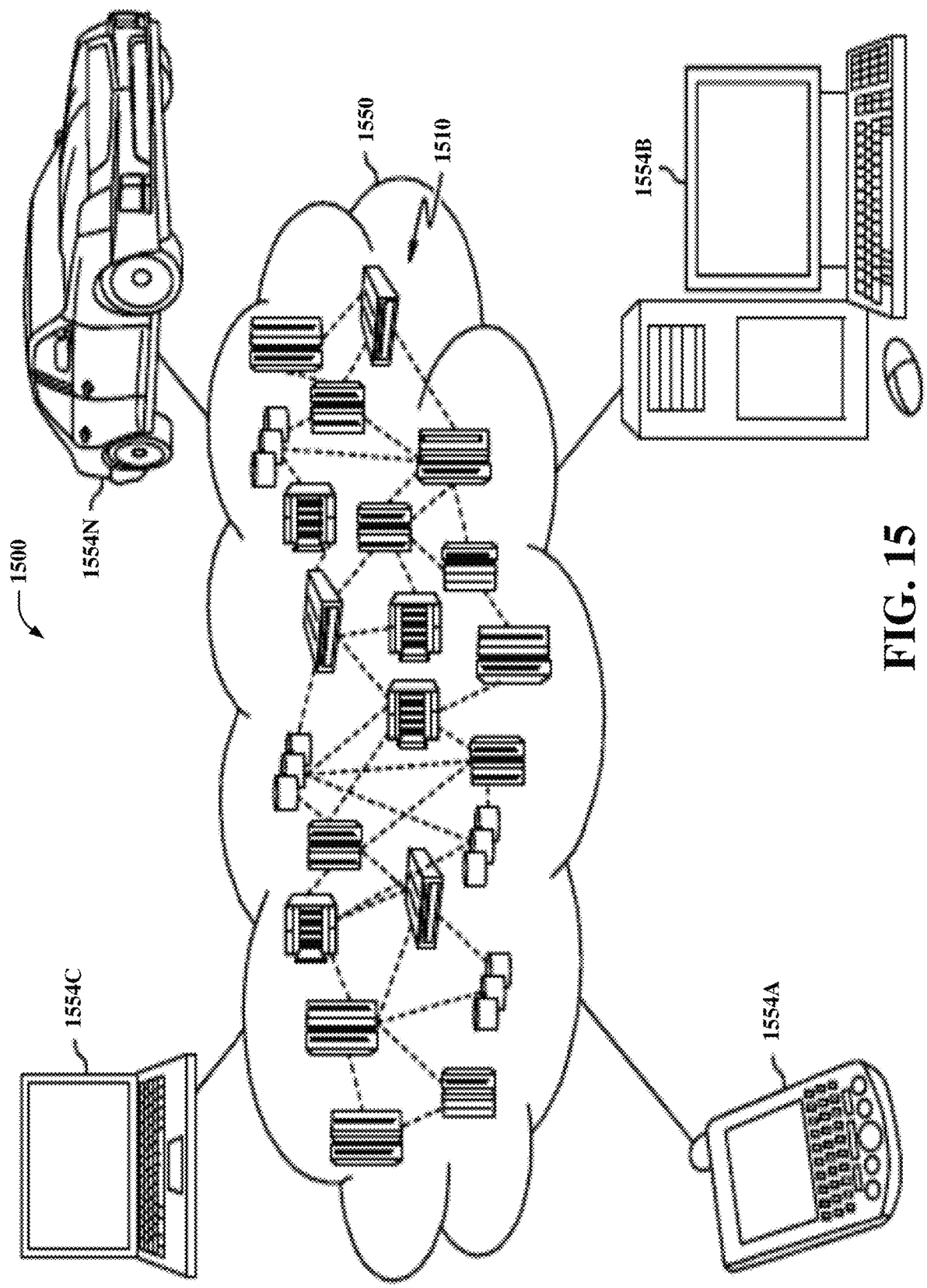
FIG. 15 illustrates a block diagram of an example, non-limiting cloud computing environment in accordance with one or more embodiments of the subject disclosure.

Referring now to FIG. 15, an illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Although not illustrated in FIG. 15, cloud computing nodes 1510 can further comprise a quantum platform (e.g., quantum computer, quantum hardware, quantum software, and/or another quantum platform) with which local computing devices used by cloud consumers can communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
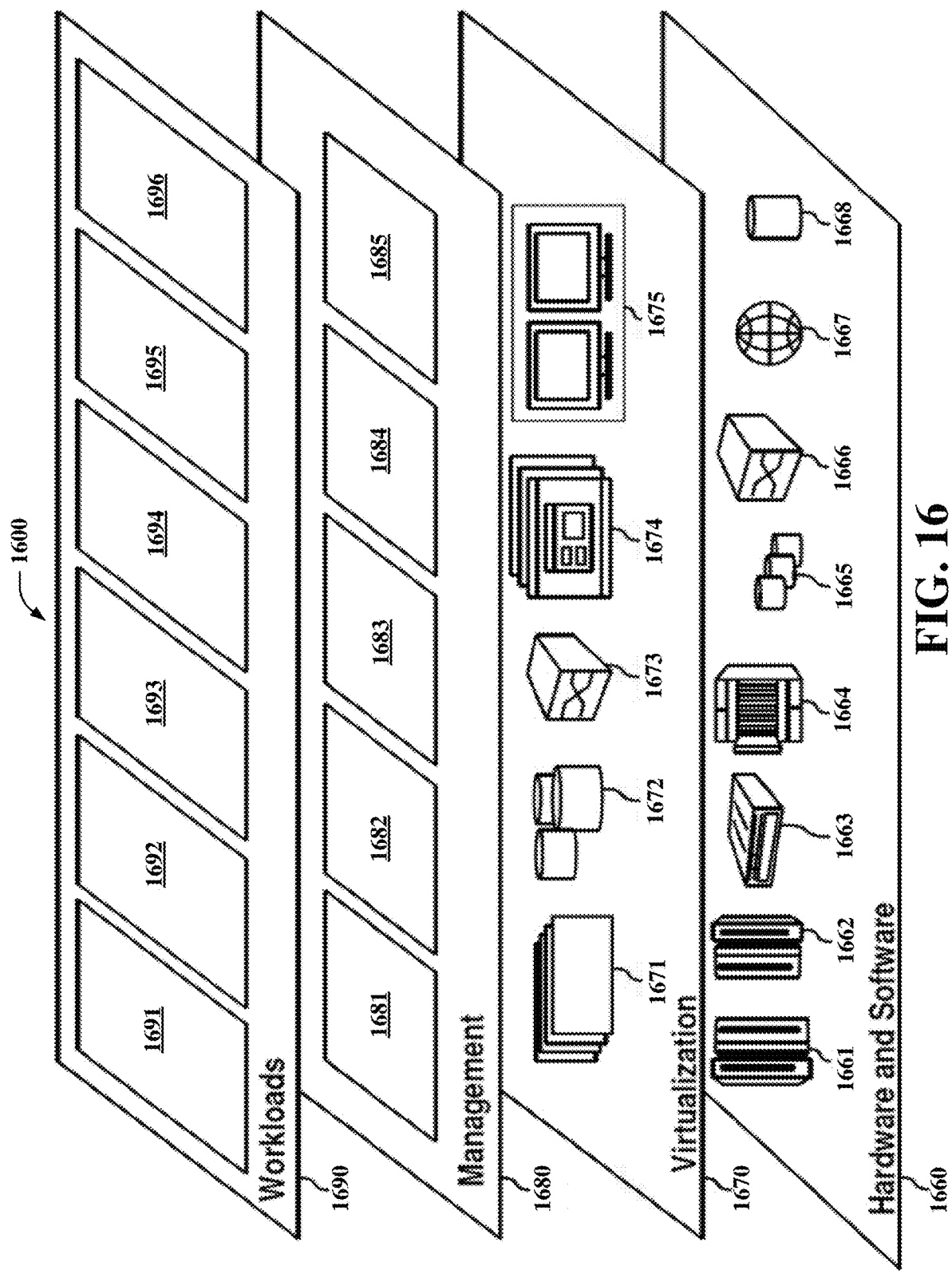
FIG. 16 illustrates a block diagram of example, non-limiting abstraction model layers in accordance with one or more embodiments of the subject disclosure.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667, database software 1668, quantum platform routing software (not illustrated in FIG. 16), and/or quantum software (not illustrated in FIG. 16).

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Non-limiting examples of workloads and functions which may be provided from this layer include: mapping and navigation 1691; software development and lifecycle management 1692; virtual classroom education delivery 1693; data analytics processing 1694; transaction processing 1695; and dual learning bridge software 1696.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a processor that executes computer executable components stored in memory, the computer executable components comprising:
  a model component that trains a machine learning model to learn associations between text data and a knowledge graph using a learning technique comprising a translation stage and a back-translation stage resulting in a cycle loss, wherein the machine learning model comprises an encoder, a first decoder, and a second decoder, and wherein the model component:
  trains the encoder to encode the text data and knowledge graph paths of the knowledge graph into outputs in a common encoding space,
  trains the first decoder to decode the outputs of the encoder into the text data, and
  trains the second decoder to decode the outputs of the encoder into the knowledge graph paths; and
a translation component that uses the machine learning model to bidirectionally translate second text data and one or more knowledge graph paths based on the associations.

2. The system of claim 1, wherein the computer executable components further comprise:
a graph component that generates a second knowledge graph using at least one of the knowledge graph or the one or more knowledge graph paths, thereby providing at least one of a reduced processing workload associated with generating the second knowledge graph, a reduced build time associated with generating the second knowledge graph, enrichment of the knowledge graph or the second knowledge graph, or completion of the knowledge graph or the second knowledge graph.

3. The system of claim 1, wherein the model component trains the machine learning model to learn the associations using at least one of an unsupervised learning technique or a supervised learning technique.

4. The system of claim 1, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and wherein the translation component uses the machine learning model to translate the second text data to the one or more knowledge graph paths based on the associations.

5. The system of claim 1, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and wherein the translation component uses the machine learning model to translate the one or more knowledge graph paths to the second text data based on the associations.

6. The system of claim 1, wherein the model component employs trains the machine learning model to learn the associations using an unsupervised learning technique and cyclical translation of at least one of the text data and the knowledge graph paths of the knowledge graph or the second text data and the one or more knowledge graph paths.

7. The system of claim 1, wherein the knowledge graph is indicative of prior knowledge corresponding to a domain.

8. A computer-implemented method, comprising:
training, by a system operatively coupled to a processor, a machine learning model to learn associations between text data and a knowledge graph using a learning technique comprising a translation stage and a back-translation stage resulting in a consistency loss wherein the machine learning model comprises an encoder, a first decoder, and a second decoder, and wherein the training comprises:
  training the encoder to encode the text data and knowledge graph paths of the knowledge graph into outputs in a common encoding space,
  training the first decoder to decode the outputs of the encoder into the text data, and
  training the second decoder to decode the outputs of the encoder into the knowledge graph paths; and
using, by the system, the machine learning model to bidirectionally translate second text data and one or more knowledge graph paths based on the associations.

9. The computer-implemented method of claim 8, further comprising:
generating, by the system, a second knowledge graph using at least one of the knowledge graph or the one or more knowledge graph paths, thereby providing at least one of a reduced processing workload associated with generating the second knowledge graph, a reduced build time associated with generating the second knowledge graph, enrichment of the knowledge graph or the second knowledge graph, or completion of the knowledge graph or the second knowledge graph.

10. The computer-implemented method of claim 8, further comprising:
training, by the system, the machine learning model to learn the associations using at least one of an unsupervised learning technique or a supervised learning technique.

11. The computer-implemented method of claim 8, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and further comprising:
using, by the system, the machine learning model to translate the second text data to the one or more knowledge graph paths based on the associations.

12. The computer-implemented method of claim 8, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and further comprising:
using, by the system, the machine learning model to translate the one or more knowledge graph paths to the second text data based on the associations.

13. The computer-implemented method of claim 8, further comprising:
training, by the system, the machine learning model to learn the associations using an unsupervised learning technique and cyclical translation of at least one of the text data and the knowledge graph paths of the knowledge graph or the second text data and the one or more knowledge graph paths.

14. The computer-implemented method of claim 8, wherein the knowledge graph is indicative of prior knowledge corresponding to a domain.

15. A computer program product comprising a computer readable storage medium having program instructions embodied therewith, the program instructions executable by a processor to cause the processor to:
train a machine learning model to learn associations between text data and a knowledge graph using a learning technique comprising a translation stage and a back-translation stage resulting in a cycle loss, wherein the machine learning model comprises an encoder, a first decoder, and a second decoder, and wherein the training comprises:
   training the encoder to encode the text data and knowledge graph paths of the knowledge graph into outputs in a common encoding space,
   training the first decoder to decode the outputs of the encoder into the text data, and
   training the second decoder to decode the outputs of the encoder into the knowledge graph paths; and
use the machine learning model to bidirectionally translate second text data and one or more knowledge graph paths based on the associations.

16. The computer program product of claim 15, wherein the program instructions are further executable by the processor to cause the processor to:
   generate a second knowledge graph using at least one of the knowledge graph or the one or more knowledge graph paths, thereby providing at least one of a reduced processing workload associated with generating the second knowledge graph, a reduced build time associated with generating the second knowledge graph, enrichment of the knowledge graph or the second knowledge graph, or completion of the knowledge graph or the second knowledge graph.

17. The computer program product of claim 15, wherein the program instructions are further executable by the processor to cause the processor to:
   train the machine learning model to learn the associations using at least one of an unsupervised learning technique or a supervised learning technique.

18. The computer program product of claim 15, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and wherein the program instructions are further executable by the processor to cause the processor to:
   use the machine learning model to translate the second text data to the one or more knowledge graph paths based on the associations.

19. The computer program product of claim 15, wherein at least one of the text data or the second text data is selected from a group consisting of structured text data, unstructured text data, a sequence of tokens, a sequence of textual characters, a sequence of alphanumeric characters, at least one word, at least one number, at least one sentence, or at least one paragraph, and wherein the program instructions are further executable by the processor to cause the processor to:
   use the machine learning model to translate the one or more knowledge graph paths to the second text data based on the associations.

20. The computer program product of claim 15, wherein the program instructions are further executable by the processor to cause the processor to:
   train the machine learning model to learn the associations using an unsupervised learning technique and cyclical translation of at least one of the text data and the knowledge graph paths of the knowledge graph or the second text data and the one or more knowledge graph paths.

\* \* \* \* \*